United States Patent [19]

Fletcher et al.

[11] 4,184,018

[45] Jan. 15, 1980

[54] NON-FLASHING ELECTROLYTE FOR USE WITH CALCIUM ANODE

[75] Inventors: Aaron N. Fletcher, Ridgecrest; Charles D. Stanifer, Hesperia; Dan E. Bliss, Ridgecrest, all of Calif.

[73] Assignee: The United States of America as respresented by the Secretary of the Navy, Washington, D.C.

[21] Appl. No.: 8,998

[22] Filed: Feb. 5, 1979

[51] Int. Cl.$^2$ ............................................. H01M 6/04
[52] U.S. Cl. ................................... 429/199; 429/112; 252/62.2
[58] Field of Search ................ 429/199, 112; 252/518, 252/62.2

[56] References Cited

U.S. PATENT DOCUMENTS

| 3,055,960 | 9/1962 | Yalom et al. ......................... 429/112 |
| 4,086,396 | 4/1978 | Mathers et al. .................. 429/199 X |

*Primary Examiner*—Charles F. Lefevour
*Attorney, Agent, or Firm*—R. S. Sciascia; W. Thom Skeer; John Lynn

[57] ABSTRACT

An electrolyte for use in a thermal battery with a calcium anode. A mixture in which the positive ions are 20 to 30 mole percent $K^+$ and the remainder $Li^+$ and in which the negative ions are about 87.5 mole percent nitrate and the remainder chloride is non-flashing with a calcium anode, and calcium ions are permitted to move through the passivating CaO layer that forms on the anode.

1 Claim, No Drawings

NON-FLASHING ELECTROLYTE FOR USE WITH CALCIUM ANODE

BACKGROUND OF THE INVENTION

1. Field of the Invention

The present invention pertains to batteries. More particularly, the present invention pertains to electrolytes for use in thermal batteries having calcium anodes.

2. Description of the Prior Art

A calcium anode in a molten nitrate electrolyte is highly desirable for use in thermal batteries because of the high voltage outputs that may be obtained.

Two problems associated with the use of a calcium anode in a molten nitrate electrolyte are flashing and the formation of a passivating layer of CaO on the calcium anode. As used herein "flash" refers to a rapid sustained reaction of calcium with nitrate, yeilding a flash of light. If flashing occurs, then the calcium may be suddenly consumed so that there can be no further flow of electrical current.

SUMMARY OF THE INVENTION

The present invention solves the above problems by providing a non-flashing electrolyte which is a mixture of $K^+$, $Li^+$, nitrate and chloride and which controls the CaO layer so that calcium ions may pass through the layer.

DESCRIPTION OF THE PREFERRED EMBODIMENT

An electrolyte with positive ions consisting of 20 to 30 mole percent $K^+$ and the remainder $Li^+$ and with negative ions consisting of about 87.5 mole percent nitrate and the remainder chloride was used with a calcium anode in a thermal battery. This electrolyte mixture has been found to be useable with a calcium anode without flash at temperatures as high as 480° C.

When the preferred mixture of ions is used as the electrolyte with a calcium anode, the thickness of the CaO layer that forms on the anode is such that flashing is prevented while calcium ions are permitted to move through the CaO layer. Control of the passivating CaO layer is provided by the chloride ion in the electrolyte. The chloride ion limits the thickness of the CaO layer and promotes cracks therein to enable calcium ions to pass through the CaO layer.

What is claimed is:

1. An electrolyte for a thermal battery having a calcium anode, consisting of a mixture in which the positive ions are 20 to 30 mole percent $K^+$ and the remainder $Li^+$ and in which the negative ions are about 87.5 mole percent nitrate and the remainder chloride.

* * * * *